United States Patent
Tamaki et al.

(10) Patent No.: US 6,190,054 B1
(45) Date of Patent: Feb. 20, 2001

(54) OPTICAL FIBER CONNECTION DEVICE AND OPTICAL FIBER CONNECTION METHOD

(75) Inventors: Yasuhiro Tamaki, Yachiyo; Toshiyuki Tanaka, Sakura; Akito Nishimura, Inba-gun; Yuichi Yoshida; Hiroshi Yokosuka, both of Sakura, all of (JP)

(73) Assignee: Fujikura Ltd., Tokyo (JP)

( * ) Notice: Under 35 U.S.C. 154(b), the term of this patent shall be extended for 0 days.

(21) Appl. No.: 09/043,388

(22) PCT Filed: Sep. 27, 1996

(86) PCT No.: PCT/JP96/02824

§ 371 Date: Mar. 17, 1998

§ 102(e) Date: Mar. 17, 1998

(87) PCT Pub. No.: WO97/13171

PCT Pub. Date: Apr. 10, 1997

(30) Foreign Application Priority Data

| Sep. 29, 1995 | (JP) | 7-253996 |
| Jan. 22, 1996 | (JP) | 8-008762 |
| Jan. 22, 1996 | (JP) | 8-008763 |
| Jan. 22, 1996 | (JP) | 8-008764 |
| Jun. 25, 1996 | (JP) | 8-164906 |

(51) Int. Cl.⁷ .................................................. G02B 6/38
(52) U.S. Cl. .................................................. 385/53; 385/65
(58) Field of Search ........................... 385/66.95, 53–69, 385/65

(56) References Cited

U.S. PATENT DOCUMENTS

| 4,997,255 | 3/1991 | Lukas et al. | 385/95 |
| 5,029,972 | 7/1991 | Lukas et al. | 385/95 |

FOREIGN PATENT DOCUMENTS

| 0 384 678 | 8/1990 | (EP) . |
| 0 396 313 | 11/1990 | (EP) . |
| 53-087246 | 8/1978 | (JP) . |
| 1-147415 | * 6/1989 | (JP) . |
| 1-115707 | * 8/1989 | (JP) . |
| 2-199407 | * 8/1990 | (JP) . |

OTHER PUBLICATIONS

Automatisierbare Fuegetechniken Fuer Glasfasern In Schal Tbaren Koppelelementen Teil II vol. 85, No. 12, Dec. 1, 1990, pp. 656–660.

* cited by examiner

Primary Examiner—Rodney Bovernick
Assistant Examiner—Ellen Kim
(74) Attorney, Agent, or Firm—Chadbourne & Parke LLP

(57) ABSTRACT

An optical fiber device 10 characterized in comprising a support mechanism 11 that supports an optical fiber connector 1 having components 2 with a two piece structure disposed one over the other and held against each other by a tension means, and at one end or the other end of which one or the other optical fibers 3,3 is inserted between said components, determining the alignment position so as to be able to connect optical fibers end to end, a separation member 20 releasing said optical fibers by spreading in the direction of separation of said components by opposing the tension of said tension means when inserted into said components from a direction straight along the longitudinal direction of said optical connector, and a push pressure device 30 which inserts said separation member between said components by applying pushing pressure in the direction of the optical connector to said seperator, and while applying end to end force to both optical fibers end to end in the component, closes the component, and clamps the optical fibers.

8 Claims, 17 Drawing Sheets

OPTICAL FIBER CONNECTION DEVICE AND OPTICAL FIBER CONNECTION METHOD

FIELD OF THE INVENTION

The present invention relates to an optical fiber connection device and to an optical fiber connection method employing end to end connection of optical fibers using an optical fiber connector.

BACKGROUND OF THE INVENTION

Conventionally, an optical fiber connector has a structure in which two optical fibers placed end to end are anchored within the same housing.

There are alignment positioning structures for optical fiber connectors having such structures as (1) a structure wherein optical fibers are inserted end to end in both ends of a fine narrow tube (called a "microcapillary" below), (2) a structure wherein optical fibers are placed together end to end in a positioning groove, and (3) a structure which supports the optical fibers and positions them in the center of three fine rods or three minute bowls. This optical fiber connector aligns a pair of optical fibers, places them end to end, and fastens or mechanically pins them into the alignment mechanism.

However, the following problems arise in the above optical fiber connector when the optical fiber is simply anchored in a housing.

First, because of differences in coefficient of thermal expansion between the housing in which the optical fibers are anchored end to end and the optical fibers, the end-to-end positioning of the optical fibers changes when there is a change in temperature. Thus, connection loss in the optical fibers becomes a problem.

Also, in the above housing the optical fibers are held by an elastic body which deteriorates over time, degrading its ability to hold the optical fibers. The end to end state of the fibers changes, and the connection loss fluctuates.

Furthermore, when a means that can suppress fluctuation in the connection loss is installed, the structure becomes complicated, and there is concern that much labor is necessary in the connecting of the optical fibers using this alignment positioning structure. Specifically, when such problems as breakage of a fiber in a fiber optical system or damage to an optical component occur, it is necessary that the connection work be speedily finished, and thus the development of an optical fiber connector which can connect optical fibers simply and accurately is desired.

In response to this need, the Applicants have already proposed an optical connector, such as that disclosed in PCT/JP96/02357 (International Application Number).

When assembled, this optical fiber connector generally has a structure comprising a component with a two piece structure having the form of a rod, and a C-shaped spring formed in a tube having a C-shape in cross-section applying a clamping force to the components inserted therein. In the center of the components, there is an alignment mechanism which can position the adjustment of optical fibers connected end to end and longitudinally inserted in both ends of this component. This alignment mechanism has such structures as (1) a structure into which optical fibers are inserted and placed end to end in both ends of a microcapillary, (2) a structure into which optical fibers are placed together end to end in a positioning groove, and (3) a structure into which optical fibers are positioned in the center of three fine rods or three minute bowls. By securely clamping the optical fiber inserted in the component by the clamping force of the C-shaped spring, the optical fiber connector securely supports the connected state of the optical fibers connected end to end, and at the same time makes possible the extraction and switching of optical fibers by inserting a wedge through the open part of the C-shaped spring and releasing the clamping force applied to the optical fiber.

However, because the above-described optical connector is small, the operation of stretching open the C-shaped spring is difficult, and when inserting the optical fiber, the optical fiber must be inserted into the component while it is being stretched open. Thus, in order to optically connect the optical fibers together at the desired connection loss, much labor is required, and there is insufficient operability. In addition, if the wedge is inserted with too much force or if a pinching force is applied for an excessively long period of time, small deformations of the components are produced, the insertion capacity of the C-shaped spring becomes unsplatform, and this will possibly influence the precision of the connection between the optical fibers in the optical fiber connector. Thus, it is necessary to pay careful attention to the operation. Because of this, the development of a special device allowing the convenient end to end connecting of optical fibers in an optical fiber connector while not exerting an excessive lateral pressure on the component is desirable.

In the optical connection of optical fibers together, there are many instances when connection switching is necessary. For example, leaving one fiber in place and replacing the other fiber is frequently desired. Thus, as a device for the above optical fiber connector, it is desirable that connection switching be easily performed.

In consideration of the above, the object of the present invention is to provide an optical fiber connection device and optical fiber connection method that makes possible easy end-to-end connection of optical fibers using an optical fiber connector of a type wherein a pair of optical fibers is inserted and connected end to end between components of a two piece structure.

In addition, it is a further object of the present invention to provide an optical fiber connection device and optical fiber connection method that facilitates easy connection switching of optical fibers.

DESCRIPTION OF THE DEVICE

The present invention is an optical fiber connection device and optical fiber connecting method which employs an optical fiber connector having a component having a two piece structure, one disposed over the other longitudinally, and held against each other by an tension means, and pinching between the components in one end or the other end in the longitudinal direction one or the other optical fiber, positioning the alignment so that the optical fibers will be connected with one another end to end.

In the above optical fiber connection device, when the optical fibers are connected, by the operation of an insertion mechanism, a separation member is inserted between the components of the optical fiber connector supported by a support mechanism, spreading apart the components, and then by extracting the separation member from the components, the optical fibers which have been made to lay end to end are clamped inside the components by tension of the tension means, and maintained in a connected condition. By this optical fiber connection device, after supporting the optical fiber connector by the support mechanism, simply by operating a pressure mechanism, the operation of inserting the separation member into the components can be performed, and the operability is improved. Moreover, the present invention encompasses structures wherein a pressure mechanism moves the separation member by the driving force of a drive source using electricity, magnetism, oil pressure, etc.

The optical fiber connector utilizing this optical connector device preferably uses a sleeve-shaped spring whose cross-section is, for example, in the form of a round C or a rectangular C as an tension means, and in this case, the separating member is inserted between the components via the opening which opens in the side wall of these springs. Also, the optical fiber connector employs as the optical fiber positioning alignment means such structures as (1) a structure into which optical fibers are inserted and placed end to end in both ends of a microcapillary, (2) a structure in which optical fibers are placed together end to end in a positioning groove, and (3) a structure in which optical fibers are positioned in the center of three fine rods or three minute bowls.

When the separating member is allowed to move in the longitudinal direction of the components, this movement adjusts the insertion position of the separating member into the components. In this manner, an area is selected in which the action of the tension of the tension means in the components is released. That is, when the separation member is inserted at the position where the components spread apart evenly across the entire longitudinal direction, it becomes possible to extract the optical fibers from the entire component. When the separation member is inserted at a position at which only one side of the components spreads open in the longitudinal direction, only the optical fiber inserted at the open longitudinal direction of the components can be removed. Here, the clamped state of the optical fiber inserted at the other longitudinal end is maintained, and when the optical fiber on the open side in the longitudinal direction is exchanged, connection switching can be easily performed.

When using a construction having a moving platform which applies an urging force to the separation means by bringing the moving platform up to the optical fiber connector supported by the supporting mechanism and has a restoring mechanism which restores the position of the moving platform, the separation member is inserted in the optical fiber connector supported by the supporting mechanism, the pressure mechanism is engaged, the moving platform is moved close to the optical fiber connector, and by this moving platform the separation member is pushed, and the separation member is inserted into the optical fiber connector. Here, if the urging force pushing on the moving platform is released, the restoring mechanism moves rapidly, and the moving platform is restored in the direction that separates it from the optical fiber connector. Also, in this arrangement, when the moving platform separates from the optical fiber connector, because relative displacement between the moving platform and the separation member is allowed, even after the moving platform has moved, the separation member remains inserted in the component due to the extraction resistance, and when lateral pressure is not impinging, the opened state of the components is maintained. In this manner, transformation due to opening the components is prevented, the alignment precision of the optical fiber can be maintained over long periods of time, and the desired connection loss can always be accurately obtained. This also increases the average life of the components.

When an engagement member protruding from the moving platform has been inserted into the engagement hole formed in the separation member, after inserting the separation member into the components, the engagement member moves along with the moving platform at the same time that the moving platform becomes separated from the optical fiber connector. The distance of movement of the moving platform and the engagement member is within the range of the possible movement of separation of the engagement member inside the engagement hole, and even after the moving platform has moved, the separation member remains inserted in the components due to the extraction resistance from the components. In this manner, the components are maintained in an opened state without application of lateral force.

In addition, by separating the moving platform further from the optical fiber connector, the engagement member is engaged in the separation member, travels with the moving platform, is extracted from the components, and returns to a standby state in the original position for the next insertion action. In this manner, the transition to the next component opening action is rapic, increasing the working efficiency.

When using a pushing mechanism having a drive source, the movement of the moving platform towards and away from the supporting mechanism, or in both directions, is carried out by the driving power produced by the drive source.

When a joining mechanism for end to end placement is provided, by moving the clamp body supporting the optical fiber towards the support mechanism, the supported optical fiber is inserted into the optical fiber connector. Because the clamp body supports the optical fiber on the alignment axis of the supported optical fiber connector, by simply moving the optical fiber towards the clamped support mechanism, an optical fiber can be easily inserted into the components.

Also, in the range of movement of the clamp body and the supporting mechanism, it is possible to install a guide body which guides the optical fiber to a position along the alignment axis of the optical fiber connector. In this manner, as the clamp body moves, the guide body continually supports the moving optical fiber on the alignment axis of the optical fiber connector, and thus the insertion action of the optical fiber by the movement of the clamp body proceeds smoothly.

Even after an optical fiber is laid end to end with the optical fiber opposite it in the optical fiber connector, a joining mechanism continuously applies urging force in the direction of the opposite optical fiber until both end to end optical fibers are clamped into the components by the tension of the tension means. This urging force can be achieved generally by two methods: (1) urging force on the clamp body itself in the direction of the supporting mechanism, and (2) bending the optical fiber that is supported in this clamp body and using the reactive force of the rigidity of the optical fiber itself In this manner, an joining force is applied when the fibers laid end to end are joined, and between the optical fibers which have been joined end to end, the desired connection loss between the optical fibers connected end to end can be securely obtained.

The clamp body can also support the optical fibers when it is at a slight inclination from the alignment axis of the optical fiber connector, and in this manner, by the reactive force due to the rigidity of the bent optical fiber, the joining force can be easily obtained. When the guide body is installed, a capacity for maintaining the bending of the optical fiber is provided to the guide body.

When provided with a suspension member, the optical fiber connection device of the present invention can be suspended on any rigid structure using this suspension member, such as the optical cables at a work site, improving the operability of the device at the work site. As a suspension member, a metallic hook, for example, is preferable.

When an ejector mechanism is provided, after completion of the work, the optical fiber connector is ejected with the ejector mechanism, and it is released from the supporting mechanism. After completion of connecting work, for example, when the ejection mechanism is activated, the optical fiber connector can easily be removed from the supporting mechanism, and the next operation can be rapidly commenced. Because is it desirable that the supporting mechanism be a structure supporting the precise positing of the optical connector, there are situations in which it almost completely surrounds the optical fiber connector, and by the installation of the ejector mechanism, the degree of freedom in construction of the supporting mechanism is increased because concerns about lowering the operability of the ejection work of the optical fiber connector are dispelled.

Moreover, examples of ejector mechanisms are (1) a lever, (2) a rack-and-pinion mechanism, and (3) a link mechanism. First, using a lever facilitates reduction the size and simplifies the structure, and by installing it adjacent to the supporting mechanism, the work area for removing the ejected optical fiber connector, for example, may be made closer to the operation area of the ejector mechanism, and both activities can be carried out rapidly. The construction of a rack-and-pinion mechanism and the link mechanism improve the freedom of design, and it is easy to attain a large ejection force.

According to the optical fiber connector of the present invention, because the components are closed and the optical fibers are held by a clamp while a force is applied end to end on both optical fibers which are placed end to end within the components, after blocking the components, the state of applied force on both the optical fibers is maintained. In this manner, the desired connection loss can be ensured. Furthermore, this connection loss can be accurately maintained over a long period of time. Also, the present invention applying the connection activities of the optical fiber using the optical fiber connection device disclosed in claims 1 through 7 will have a greatly improved effect.

Moreover, the present invention includes end to end connecting of a different optical fiber inserted from the opposite side on the components to the optical fiber inserted beforehand into the components. The optical fiber first inserted in the components can also be the other optical fiber remaining in the components when one of the pair of fibers connected end to end is removed from the components. In this manner, optical fiber connection switching is simplified.

PREFERRED EMBODIMENTS OF THE INVENTION

Figure 1A:
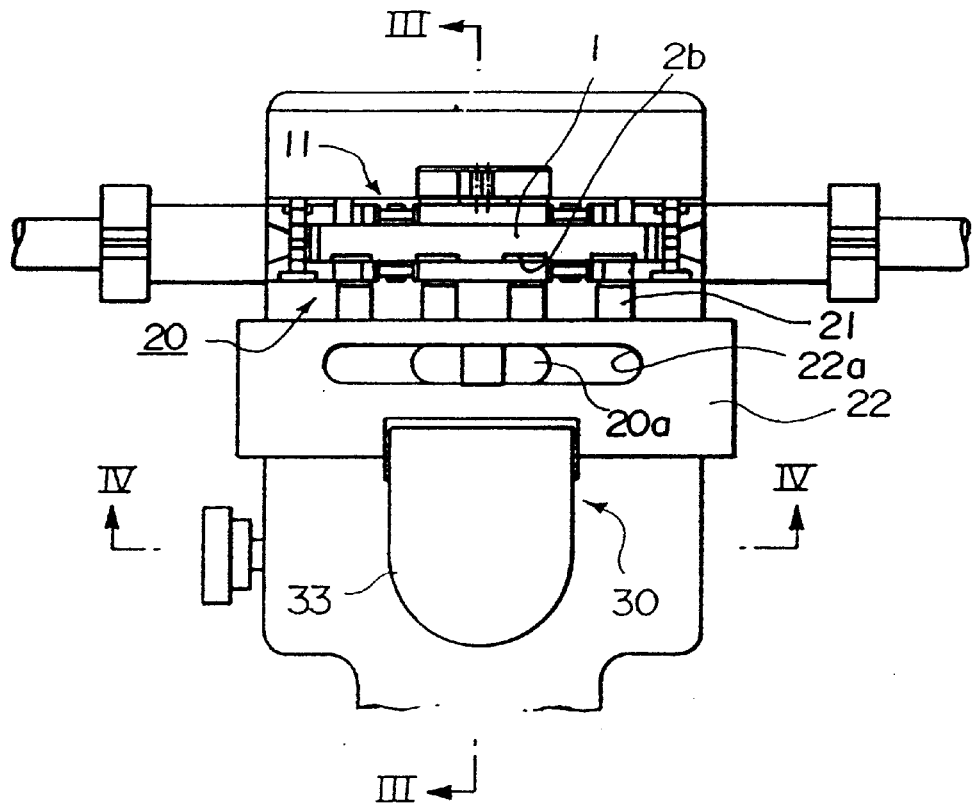
FIGS. 1A and 1B is a top view showing the first embodiment of the optical fiber connection device of the present invention, and in particular shows the appearance of the slide of the wedge (separating mechanism) in its standard position (FIG. 1A) and its condition after being moved (FIG. 1B).

The present invention is explained in detail in reference to the figures.

FIGS. 1A, 1B, 2, 3, 4A, 4B, and 5 show an embodiment of the optical fiber connection device of the present invention. In the figures, reference numeral 1 is the optical fiber connector, 11 is the supporting mechanism, 20 is the wedge (separating mechanism), 30 is the pushing pressure mechanism, 40 is the engagement mechanism, 50 is the joining mechanism, 60 is the ejector mechanism, and 70 is the suspension member.

Figure 9:
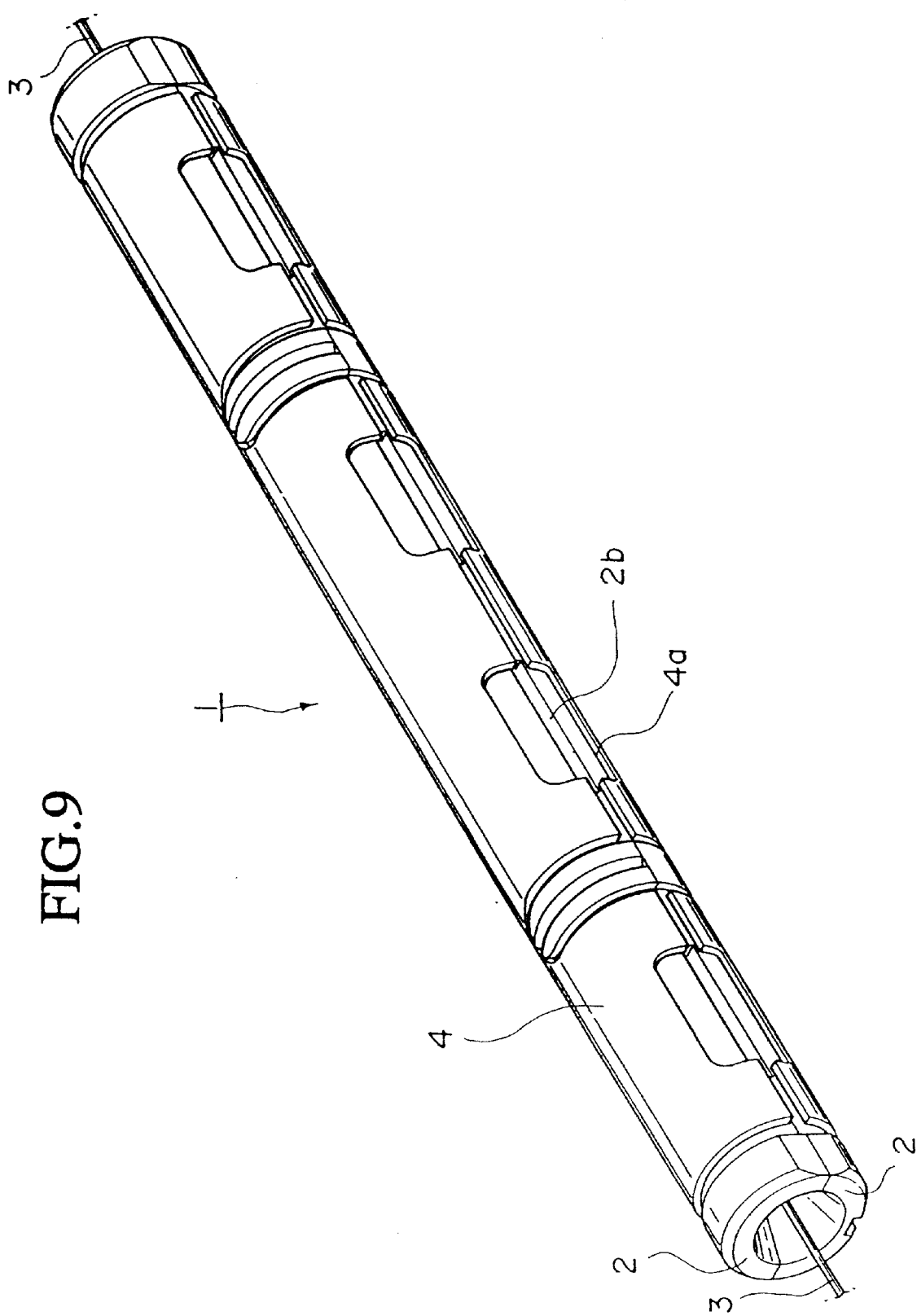
FIG. 9 is a diagonal view showing an example of the optical fiber connector using the optical fiber connecting device of the present invention.
Figure 10:
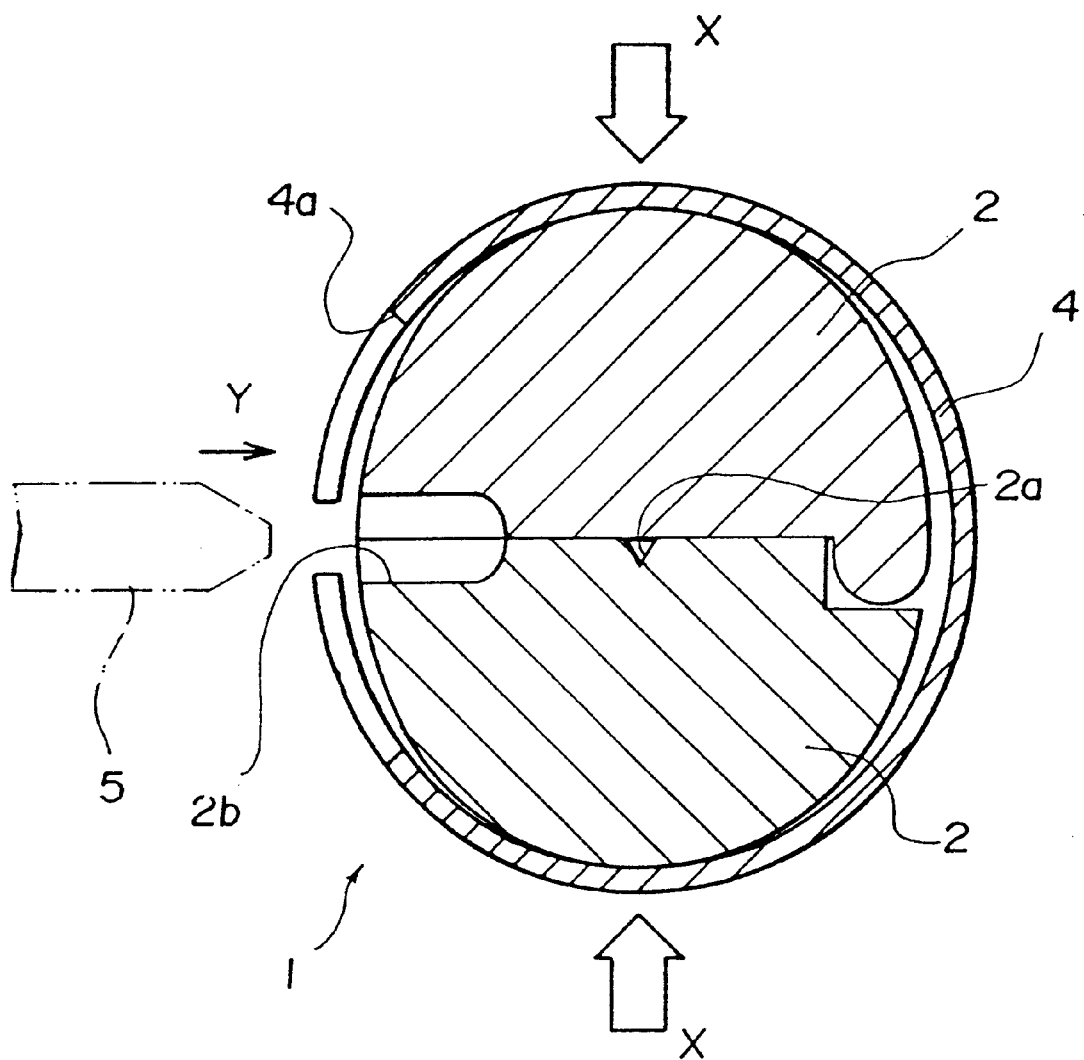
FIG. 10 is a cross section diagram of the optical fiber connector shown in FIG. 9.

The optical fiber connector shown in FIG. 9 and FIG.10 comprises components (2,2) with a two piece structure disposed longitudinally over one another, and a C-shaped spring 4 for pinching and anchoring the optical fiber 3 to which an pinching force (shown in FIG. 10 by the arrow labeled X) is applied towards the optical fiber 3 positioned in alignment so as to be able to connect end to end between the components 2,2.

In this case, one or the other of the optical fibers 3,3, are inserted individually in the longitudinal direction at one end or the other, being placed end to end and in an aligned position.

Also, the component 2 is formed having a guide groove 2*a* is the form of a V or U (shown as a V groove in FIG. 10) extending along its length. The optical fiber 3 is guided along the guide groove 2*a*, and accommodated between components 2,2, and its alignment is accurately positioned.

Furthermore, in component 2 and C-shaped spring 4, a plurality of openings 2*b* and openings 4*a* are formed along the longitudinal direction of the optical fiber connector 1 in alignment. By this construction, from a direction straight along the longitudinal direction of the optical fiber connector 1, when the wedge 5 is inserted into the openings 2*b*, 4*a*, the wedge 5 opposes the pinching force of the C-shaped spring 4, and spreads both of the components 2,2 apart in their direction of separation. In this manner, the insertion of optical fiber 3 from the longitudinal direction of the optical fiber connector 1, the extraction of optical fiber 3 in the longitudinal direction of optical fiber connector 1, and the replacement of optical fiber 3 can be easily accomplished.

Figure 1B:
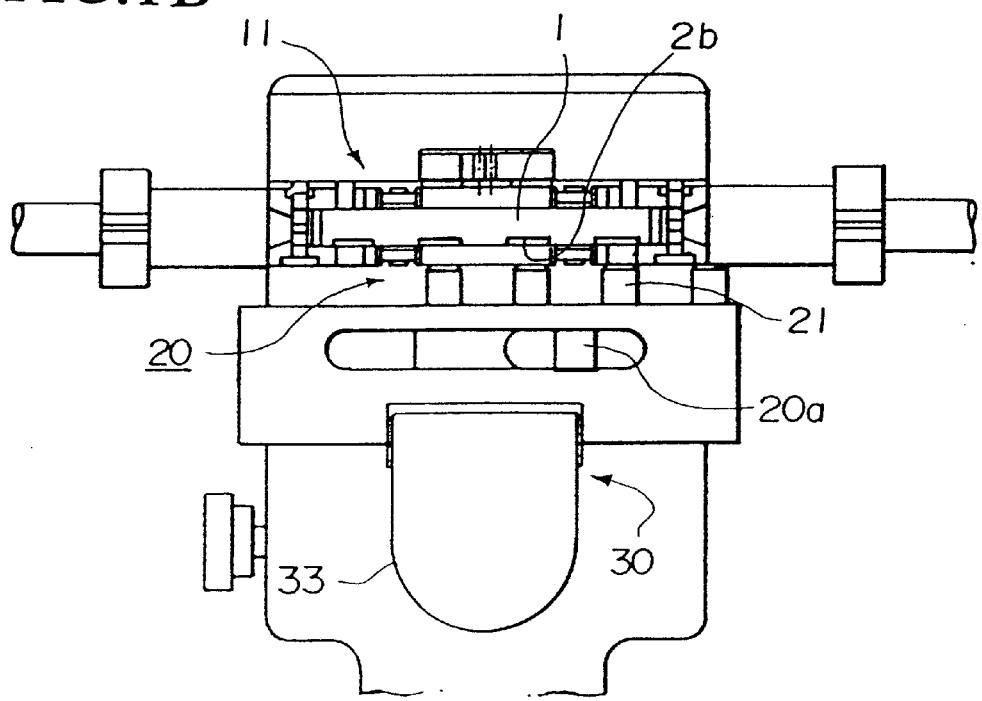

The supporting mechanism 11 is to support the optical fiber connector 1 in a fixed position within the optical connecting device 10, and is generally constructed from a support platform 12 and holding springs 13, as shown in FIGS. 1A and 1B, and and 3.

The holding springs 13 are mounted on the optical fiber connector 1.

When the optical fiber connector 1 is mounted on the supporting platform 12, the holding springs 13 are disposed at positions on both sides of the optical fiber connector 1, and the upper part has a convex part 13*a* facing the side of the optical fiber connector 1.

The wedge 20, as shown for example in FIG. 3 and FIGS. 7A, 7B, 7C, and 7D, has a plurality of blades 21 formed into a unit having ends which can be inserted into the opening 2*b*. In addition, the wedge 20 functions to release the inserted optical fiber 3 by spreading open components 2,2 in the direction of separation opposing the tension force of the C-shaped spring (tension means) when it is inserted between the components 2,2 through the opening 2*b* straight along the longitudinal direction of the optical fiber connector 1.

Figure 3:
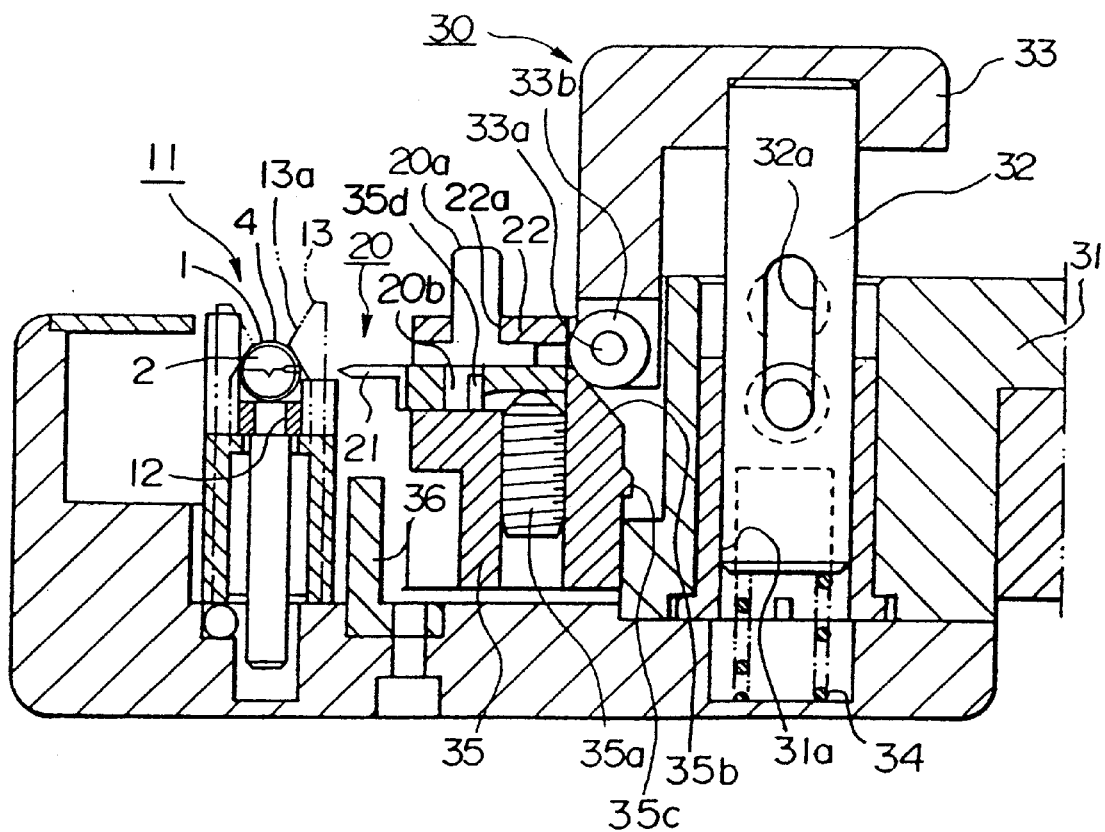
FIG. 3 is a cross section diagram along the III—III line showing the optical fiber connecting device of FIGS. 1A and 1B.

In the wedge 20, as shown in FIGS. 1A and 1B, and FIG. 3, a knob 20*a* is integrally anchored. Additionally, the wedge 20, between the tension plate 22 and the moving platform 35 (described below), is held such that it can freely slide in the longitudinal direction of the optical fiber connector 1.

Furthermore, in the tension plate 22, the guide groove 22*a* for guiding the sliding of the wedge 20 in the longitudinal direction of optical fiber connector 1, being bound by the knob 20*a*, is formed extending in the longitudinal direction of optical fiber connector 1.

Figure 7A:
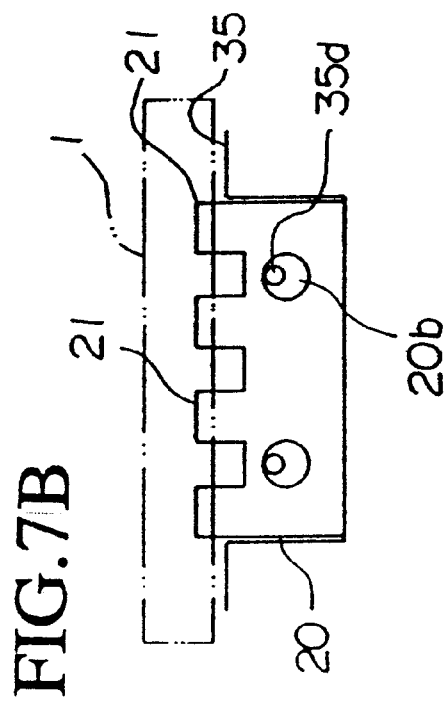
FIGS. 7A, 7B, 7C, and 7D are conceptual diagrams showing the operating state of the wedge, and showing the initial condition (FIG. 7A), the push button when pushed (FIG. 7B), the push button after release of the urging force (FIG. 7C), and the raised push button (FIG. 7D).
Figure 7B:
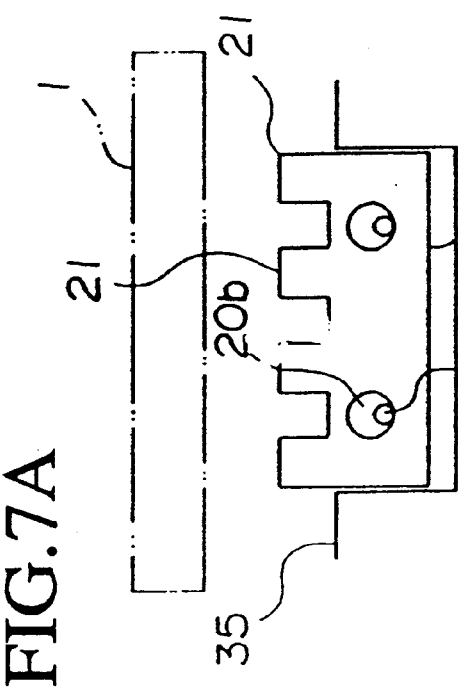
Figure 7C:
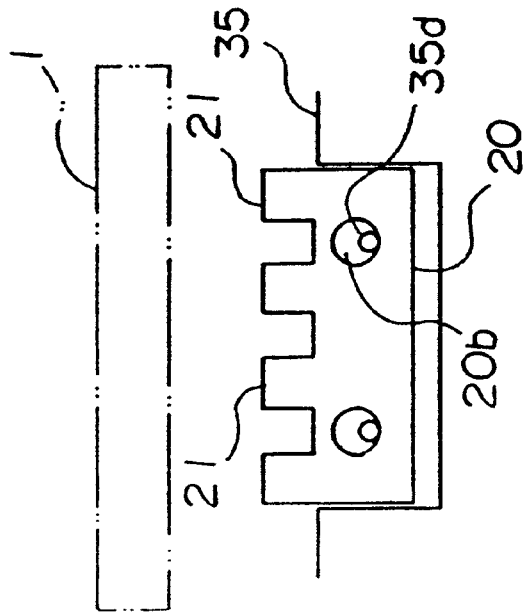

In addition, as shown in FIG. 3 and FIGS. 7A and 7B, in the wedge 20, small holes 20*b* with a diameter of about 0.9 mm are opened, and in these small holes, engagement pins 35*d* protruding from the moving platform and having a diameter of approximately 0.3 mm are inserted.

Moreover, the small holes 20*b* correspond to the engagement holes disclosed in claim 4, and the engagement pins 35*d* correspond to the same engagement members.

The pushing mechanism 30, as shown in FIG. 3, comprises a handle 31, an axle 32, a push button 33, a spring 34, a moving platform 35, and a stopper 36.

The handle 31 is a part for manually grasping the optical fiber connection device 10, and in the handle 31, upper and lower holes 31*a* are formed.

The axle 32 is constructed so as to be able to move vertically within the holes 31*a*. Down the central part of the axle 32, there are engagement holes 32*b* having slots 32*a* and long holes 32*a* bored at one end.

The push button 33 is anchored to the axle 32, and can move in the vertical direction along with the axle 32. In the push button 33, the axle body 33*a* extending in the same direction as the longitudinal direction of the optical fiber connector 1 is constructed, and further, at axle body 33*a*, a roller 33*b* that rotates freely around the axis of the axle body 33*a* is attached.

The spring 34 is interposed between the push button 33 and the handle 31, and its tension pushes the push button 33 upward with respect to the handle 31.

The moving platform 35 can move in the direction straight along the longitudinal direction of the optical fiber connector 1, and is pushed in the upward direction by the tension means disposed between the moving platform 35 and the stopper 36 (not shown in the figures). The moving platform 35, via the plunger 35*a*, holds the wedge 20 between the moving platform 35 and the tension plate 22 in a freely sliding manner. In addition, the part cooperating with the roller 33*b* of moving platform 35 has an inclined surface 35*b*. On the side surface of the moving platform 35 positioned at the lower part of the inclined surface 35*b*, a protruding part 35*c* which can engage the roller 33*b* is formed so as to protrude about 0.5 mm. The position of the protruding part 35*c* is the lower end of the movement track of the roller 33*b*.

The engagement rod 41 is connected, in order, to the knob 41*a*, the axle 41*b* which is small enough to be enclosed in a long hole 32*a* when the axle 32 is moved vertically without interference, and a round part 41*c* which is formed larger than the axle 41*b*, and is large enough to be enclosed in the engagement holes 32*b*.

The spring 42 is interposed between the knob 41*a* and the handle 31, and its line of tension is in the outer direction pushing the knob 41*a* away from the handle 31.

Figure 2:
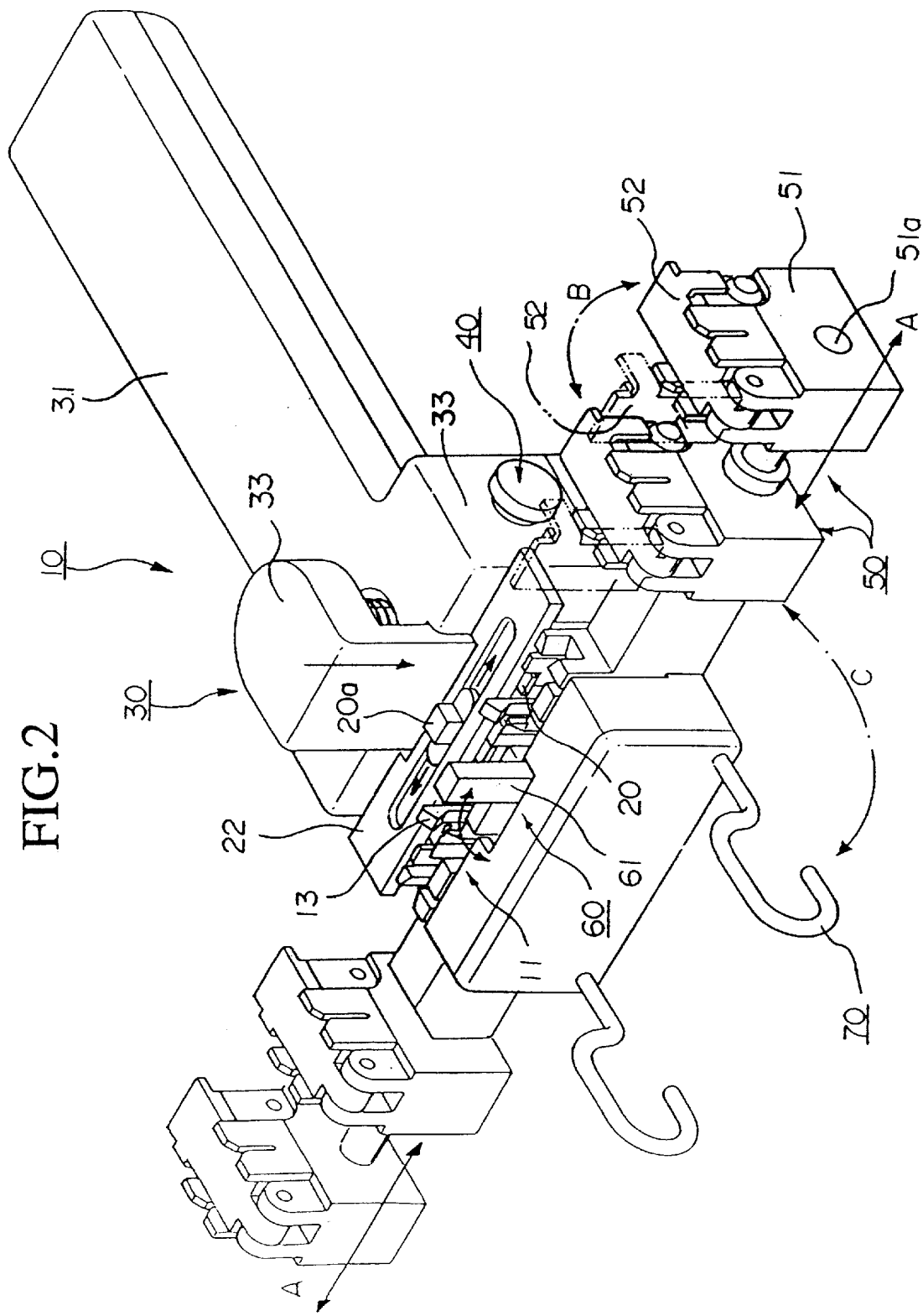
FIG. 2 is a diagonal view showing the optical fiber connecting device shown in FIGS. 1A and 1B.

The joining mechanism 50, as shown in FIG. 2, is provided with the clamp body 51.

There are two clamp bodies 51 installed on the axle 51*a* at both ends longitudinally, and can slide freely in the longitudinal direction (in the direction 'A' in the figure) on the longitudinal direction of axle 51*a*. Each clamp body 51 clamps the optic fiber 3 by the lid 52 provided on its top. The clamp body 51 on the near side of the supporting mechanism 11 inclines so as to push against one end of the optical fiber 3 in the direction of the lower part of the support mechanism. Moreover, the structure in which one end of the optical fiber 3 is inclined and supported towards the bottom of the support mechanism 11 is effective when adapted in particular to connection of a multicore optical fiber, and in this case the action of inserting each optical fiber into the guide groove 2*a* of the optical fiber connector is simplified. In the connection of single core optical fiber 3, securing the operability of the insertion of an optical fiber 3 into optical fiber connector 1 is comparatively simple. Therefore, it is not necessary to use a structure in which clamp body 51 has graded support.

The lid 52 is attached so as to be freely sliding in the direction of arrow B at one end of the clamp body 51.

The ejector mechanism 60, as shown in FIGS. 2 and 5, comprises the knob member 61 and the clutch member 62.

The knob member 61 comprises the knob 61*a*, the draw up part 61*b*, and the gear 61*c*, and when the knob 61*a* is rotated, the knob 61*a*, the draw up part 61*b*, and the gear part 61*c* rotate in the same direction around the axle 61*d*.

The clutch member 62 comprises the draw up part 62a and the gear part 62b, and when the knob 61a is rotated, the gear part 62b engages with the gear part 61c, and thus the draw up part 62a rotates around the axle 62c.

Figure 11:
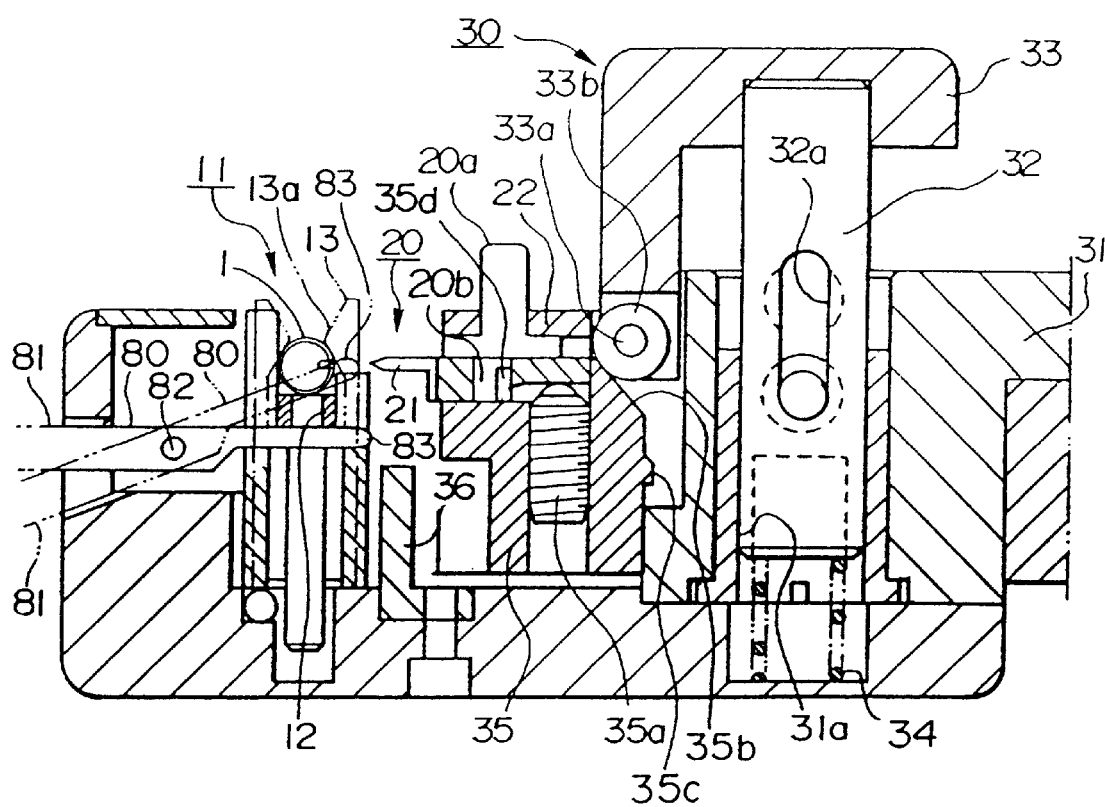
FIG. 11 is a cross section diagram showing a different state of the ejector mechanism, showing an example of an ejector lever using a fulcrum.

FIG. 11 shows the different state of the ejector mechanism.

In this figure, reference numeral 80 is the ejector lever, and by pushing down (towards the lower part of FIG. 11) the operation rod 81 which protrudes from the optical fiber connection device 10, it revolves around the pivot axle 82. The acting part 83 inserted below the supporting platform 12 passes through a slit (not shown) formed in the support platform 12 and protrudes out of the upper part of the optical fiber connector 1 on the support platform 12. With this protruding structure, scaling down the size and lowering the cost is easy because the arrangement is very simple. Also, both ejector mechanisms disclosed in FIGS. 5 and 11 are operated close to the support mechanism, and thus the ejector action of the optical connector and grabbing of the optical fiber connector can be done at the same time with the same hand, improving operability.

Figure 12:
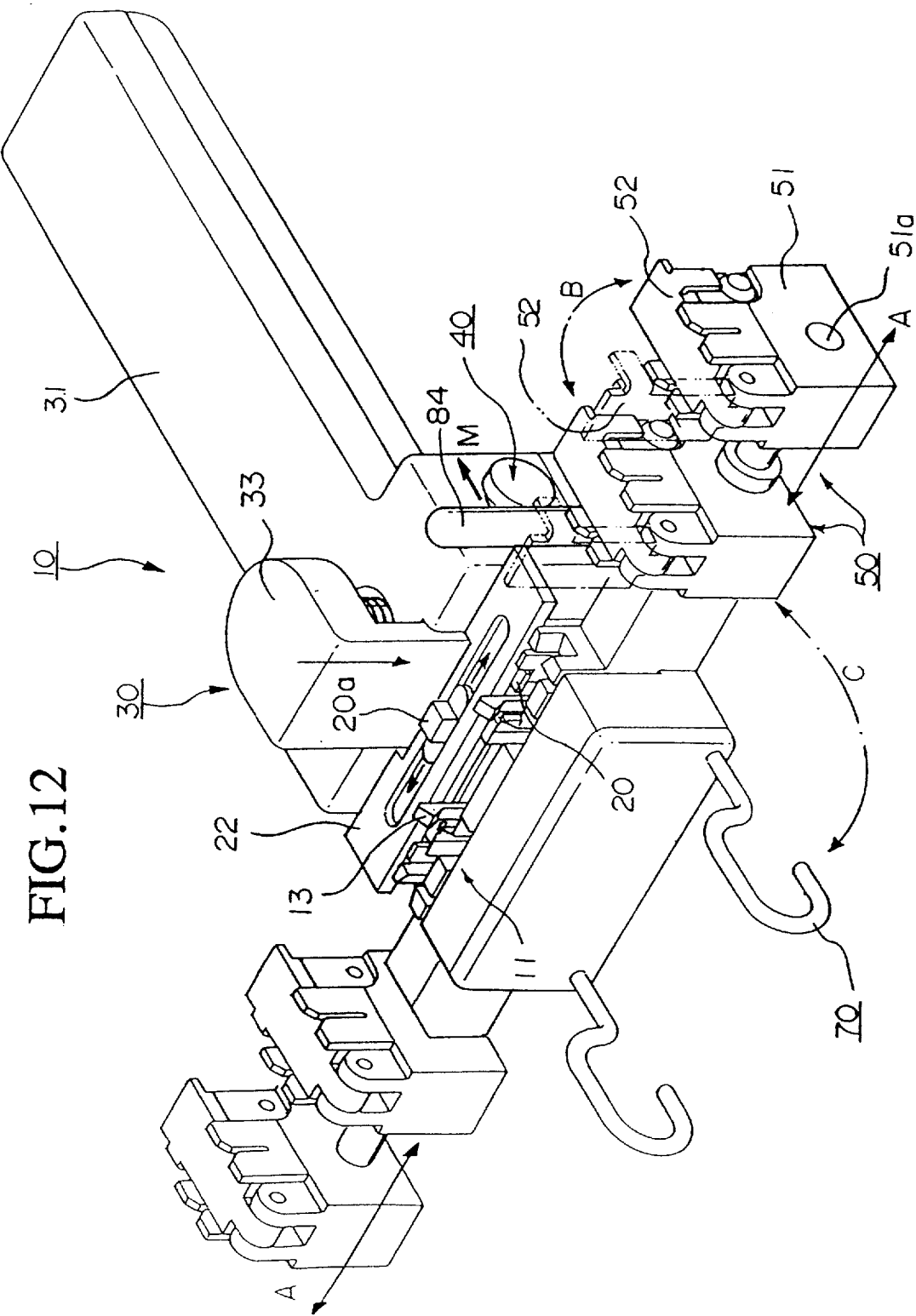
FIG. 12 is a wide view diagonal drawing showing a particular state of the ejector mechanism, and showing an example using a rack-and-pinion mechanism.
Figure 13:
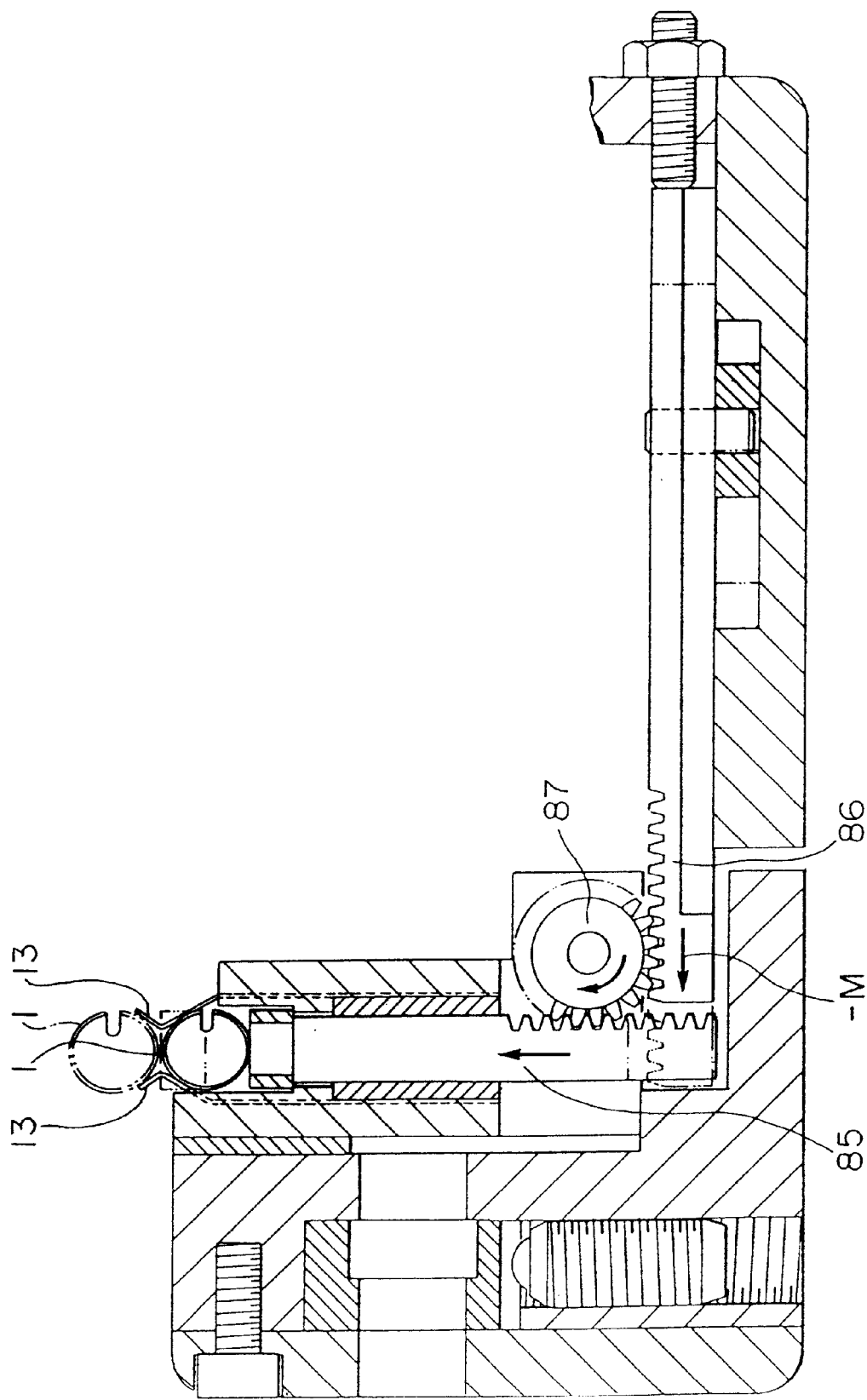
FIG. 13 is a cross section diagram showing the structure of the ejector mechanism of FIG. 12.
Figure 14:
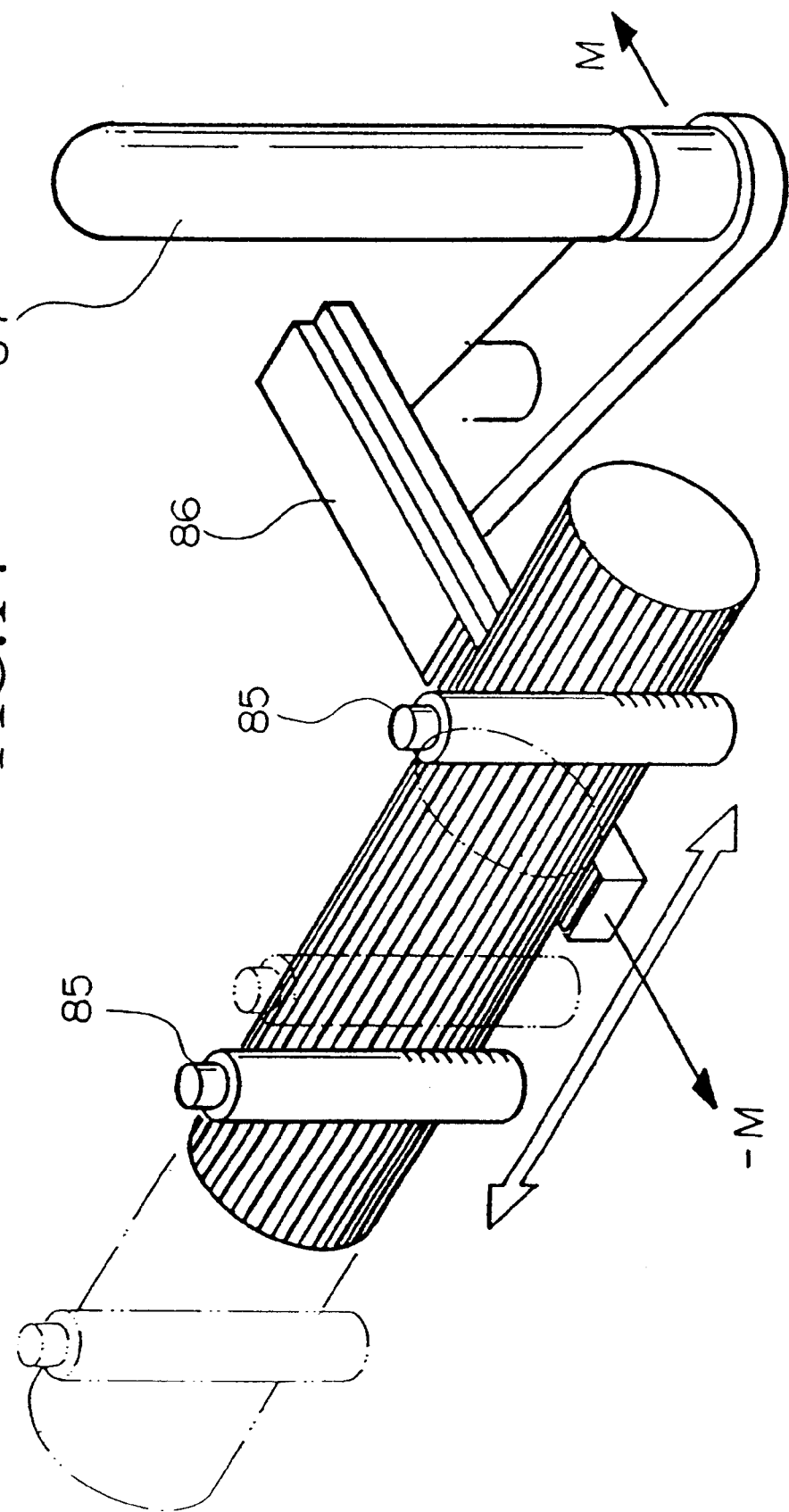
FIG. 14 is a diagonal figure showing the structure of the ejector mechanism of FIG. 12.

FIGS. 12 to 14 show an example of the ejector mechanism using a rack and pinion mechanism.

In this ejector mechanism, by rotating in the M direction the lever 84 shown in the FIG. 12, as shown in FIG. 13, the ejector arms 85, which is built in the optical fiber connection device and can be raised, are raised and the optical fiber connector 1 is ejected. The rotational torque of lever 84 moves the rod-shaped rack 86 installed on the bottom of the optical fiber connection device in the direction of the arrow M in FIGS. 13 and 14, and by the rotation of the pinion 87 engaging the rack 86, the ejector arm 85 engaging this pinion 87 is raised. Because the rack and pinion mechanism can function as an accelerator using this ejector mechanism, even when the support force impinging on the optical fiber connector 1 in the support mechanism 11 is increased, the ejecting action of the optical fiber connector 1 can be satisfactorily maintained, and the precision of the positioning and stability of the support mechanism can be improved. Also, by using a rod-shaped rack 86, the level of freedom of the design position of lever 84 is high. For example, as shown in FIG. 12, when the lever 84 is disposed adjacent to the push button 33, the operability is improved.

Figure 15:
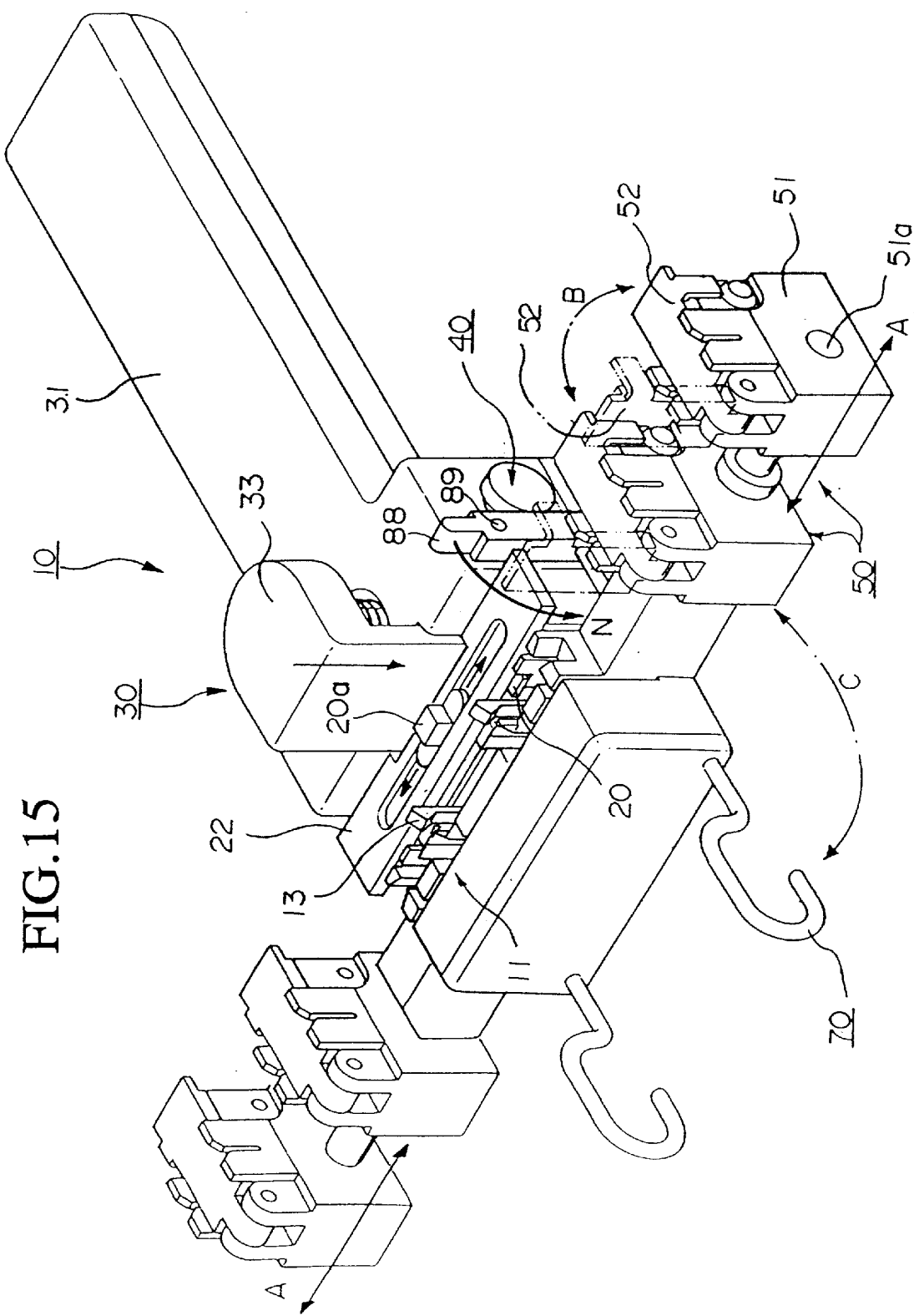
FIG. 15 is a wide view diagonal drawing showing a particular state of the ejector mechanism, and shows an example using a link mechanism.
Figure 16:
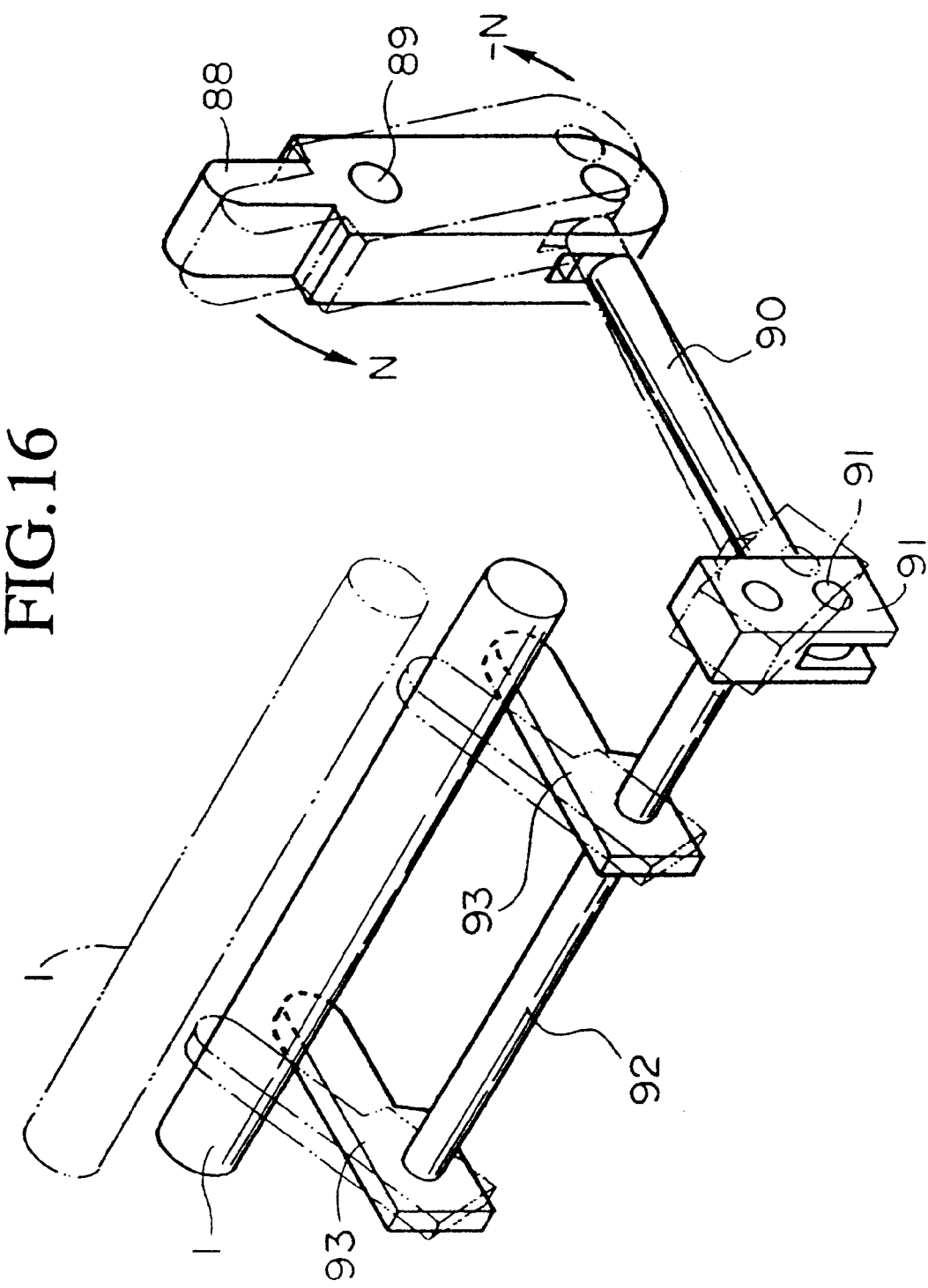
FIG. 16 is an enlargement diagram of the main components showing the ejector mechanism of FIG. 17 is a diagonal view showing the structure of the ejector mechanism of FIG. 15.
Figure 17:
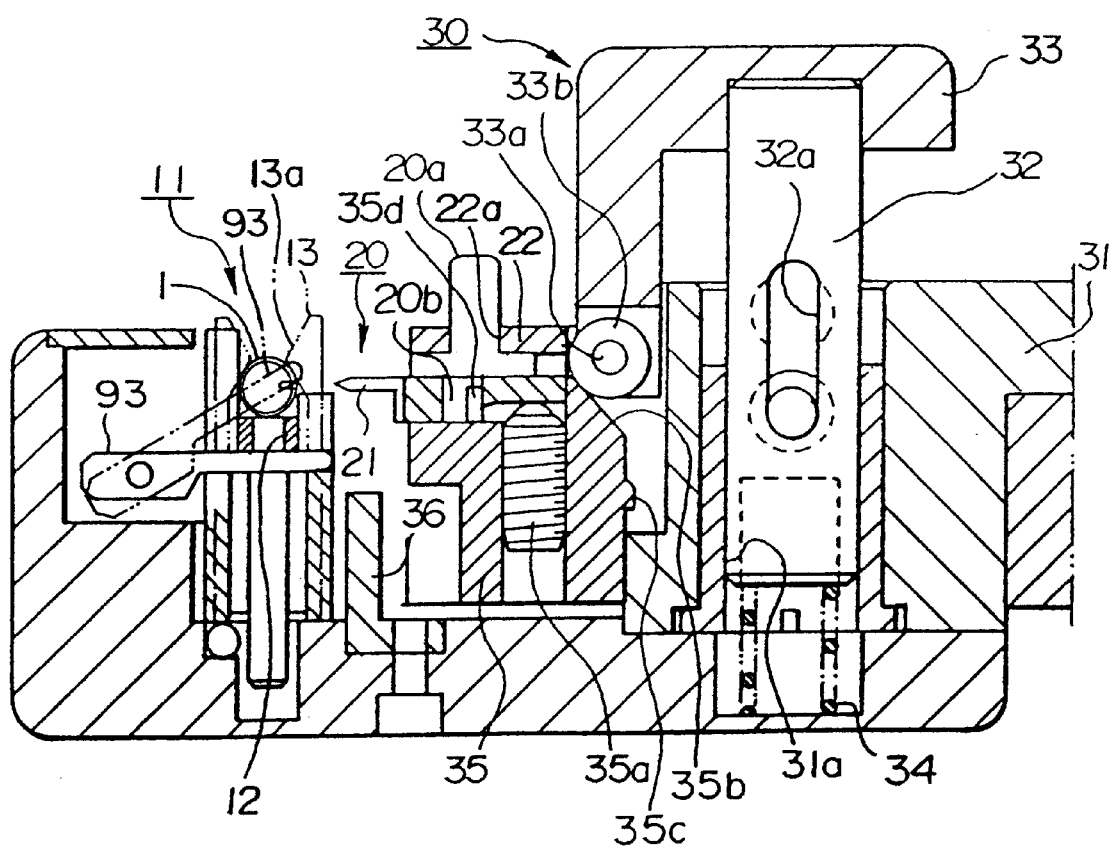

FIGS. 15 to 17 show an example of an ejector mechanism using a link mechanism.

In the ejector mechanism, as shown in FIGS. 15 and 16, when the lever 88 disposed adjacent to the push button 33 is rotated in the direction of arrow N, by the rotating of the lever 88 around the pivot axle 89, link 90 is drawn in the direction of the N arrow in FIG. 16, and the rotating bracket 91 rotates around the axle 92. In this manner, the ejector arms 93 anchored to the axle 92, as shown in FIG. 17, are raised (upper part of FIG. 17) through a slit (not shown) from the lower position of supporting platform 12 to the position of an imaginary line, and upwardly eject the optical fiber connector 1. With this ejector mechanism, there is no influence on the design of the optical fiber connecting device because by using link 90 the setting position of lever 88 can be freely raised, and at the same time the freedom of design alteration as a whole is high, and it can be easily incorporated.

The suspension member 70 has a end curved in an approximately J shape, and from this end, the whole optical fiber connection device 10 can be suspended on something else. Additionally, the suspension member 70 rotates freely in the direction of C shown in the figure, so when it is not in use, it can be stored against the side of handle 31.

First Connection Example

Next, a method of connecting optical fibers 3 end to end using the optical fiber connector 1 when using an optical fiber connection device having the above-described construction will be described.

Here, this will be explained in the case of newly optically connecting two optical fibers using the optical fiber connector 1.

When connecting end to end, first the optical fiber connector 1 is mounted on the support platform 12.

At this time, the optical fiber connector 1 is held securely and firmly between the convex parts 13a, 13a of the holding springs 13,13.

Next, the wedge 20 is moved to its predetermined position. Here, first because two optical fibers 3,3 are newly inserted from both sides longitudinally, the wedge 20 is set in the standard position shown in FIG. 1A.

Then, the push button 33 is pushed in the downward direction in the figure.

Figure 6:
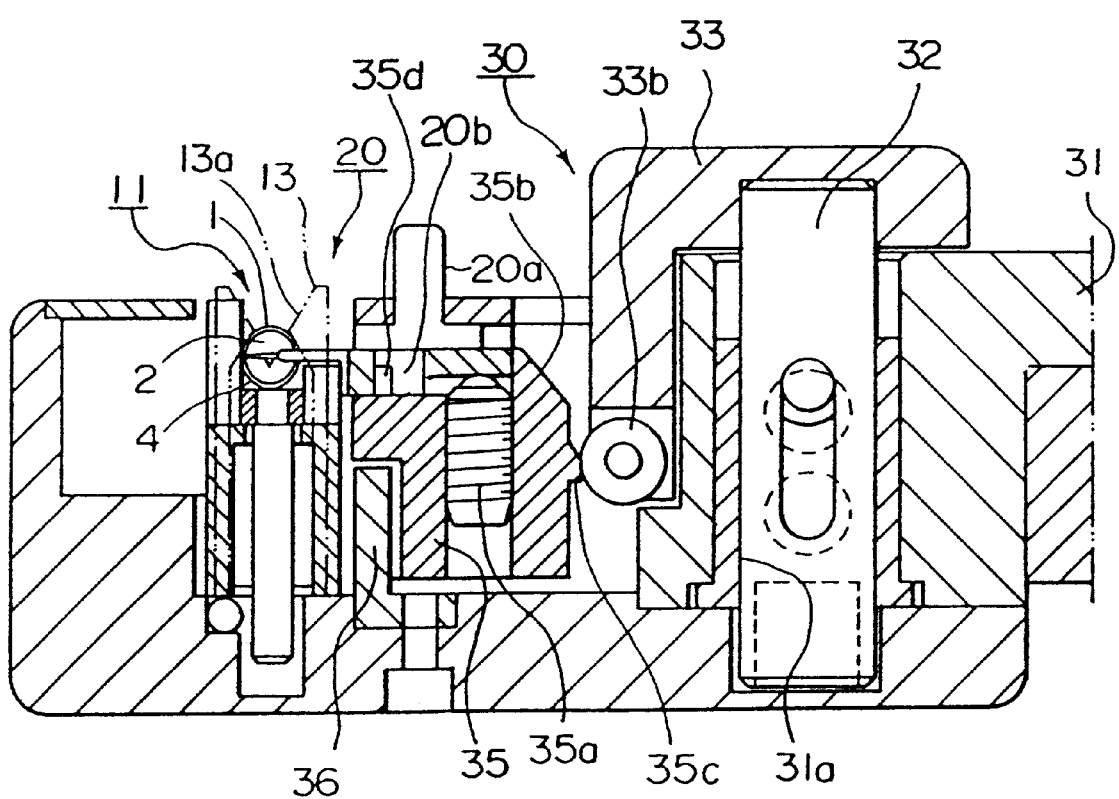
FIG. 6 is a cross section diagram along the III—III line showing the optical fiber connection device, and in particular shows the operating state of the pushing mechanism, and the condition of the push button pushed in to its greatest extent.

Next, as shown in FIG. 6, the push button 33 and the axle 32 are moved in the downward direction in the figure in reaction to the tension of spring 34. In this manner, while the roller 33b rotates catching on the protruding part 35c, and opposing the tension of the tension means (not shown in the figure), the moving platform 35 is pushed in the leftward direction in the figure. When the moving platform 35 is pushed, the wedge 20 is inserted between the components 2,2 through the opening part 2b from the direction straight along the longitudinal direction of the optical fiber connector 1, and opposing the tension of the C-shaped spring 4, the components 2,2 are spread apart in the direction of separation.

In this case, as shown in FIG. 7A, initially, between the wedge 20 and the moving platform 35, there is about a 0.5 mm clearance therebetween, but the blade part 21 of the wedge 20 makes contact with the components 2,2 of the optical fiber connector 1, and starts to press into it, as shown in FIG. 7B, the moving platform 35, as a result of continuously advancing while sliding towards the wedge 20, eliminates the clearance, and finally the forward advance of the moving platform 35 cooperates with wedge 20, and pushing the wedge 20, it is pressed between the components 2,2.

Figure 4A:
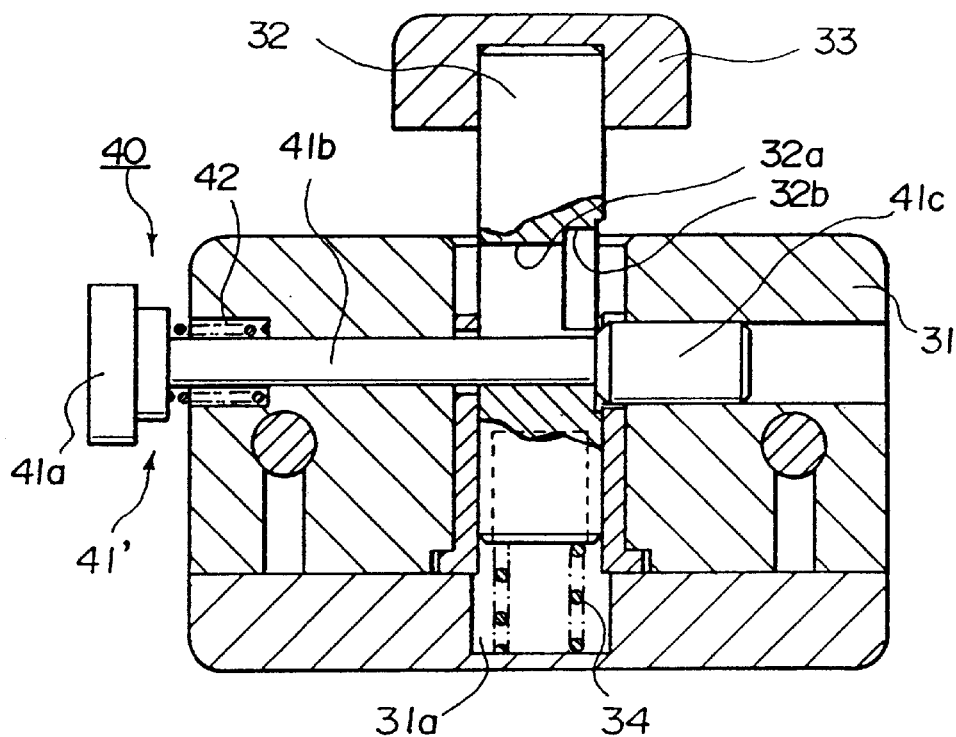
FIGS. 4A and 4B are a cross section diagrams along the IV—IV line showing the optical fiber connecting device of FIG. 1A, and in particular shows the operating state of the engagement mechanism before engagement (FIG. 4A) and after engagement (FIG. 4B).
Figure 4B:
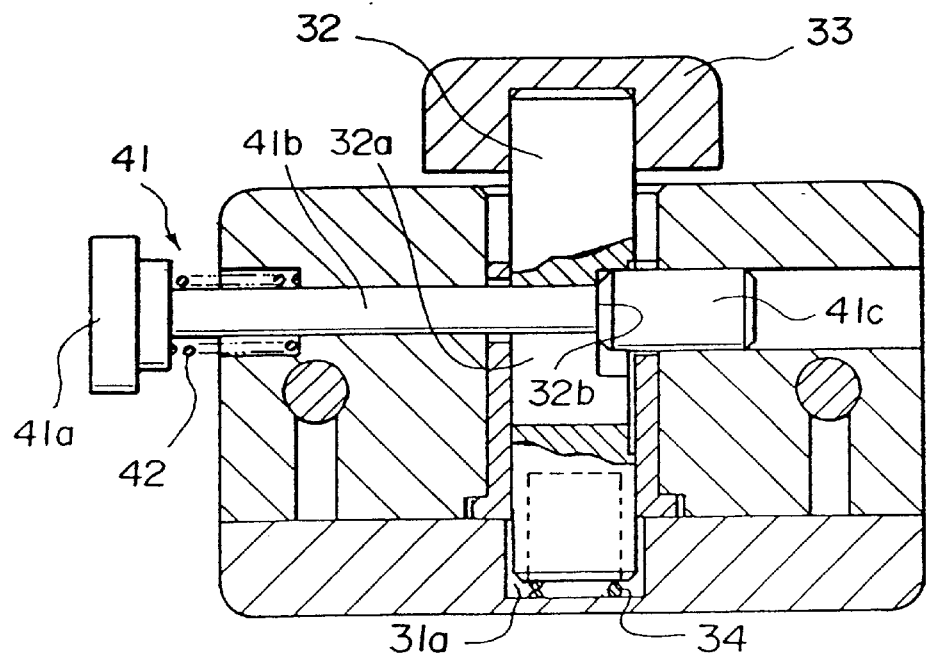

Further, in this case, when the push button 33 is pushed into its predetermined position, as shown in FIG. 4B, the round part 41c is drawn into the engagement holes 32b by the tension of the spring 42. That is, the round part 32c is engaged with the engagement holes 32b, and thus the vertical movement of the push button 33 and the axle 32 is blocked.

Figure 7D:
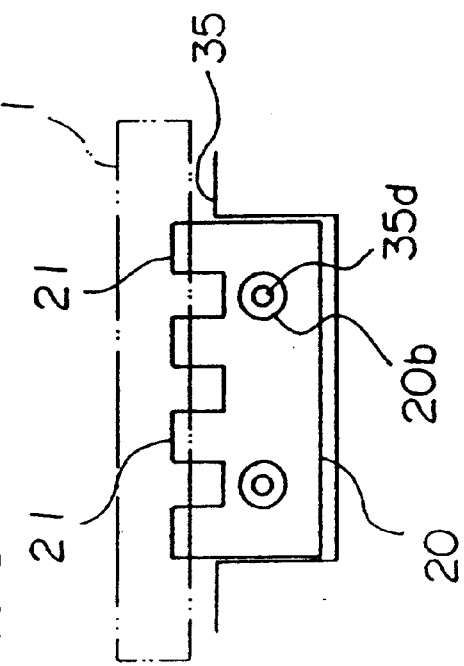
Figure 8:
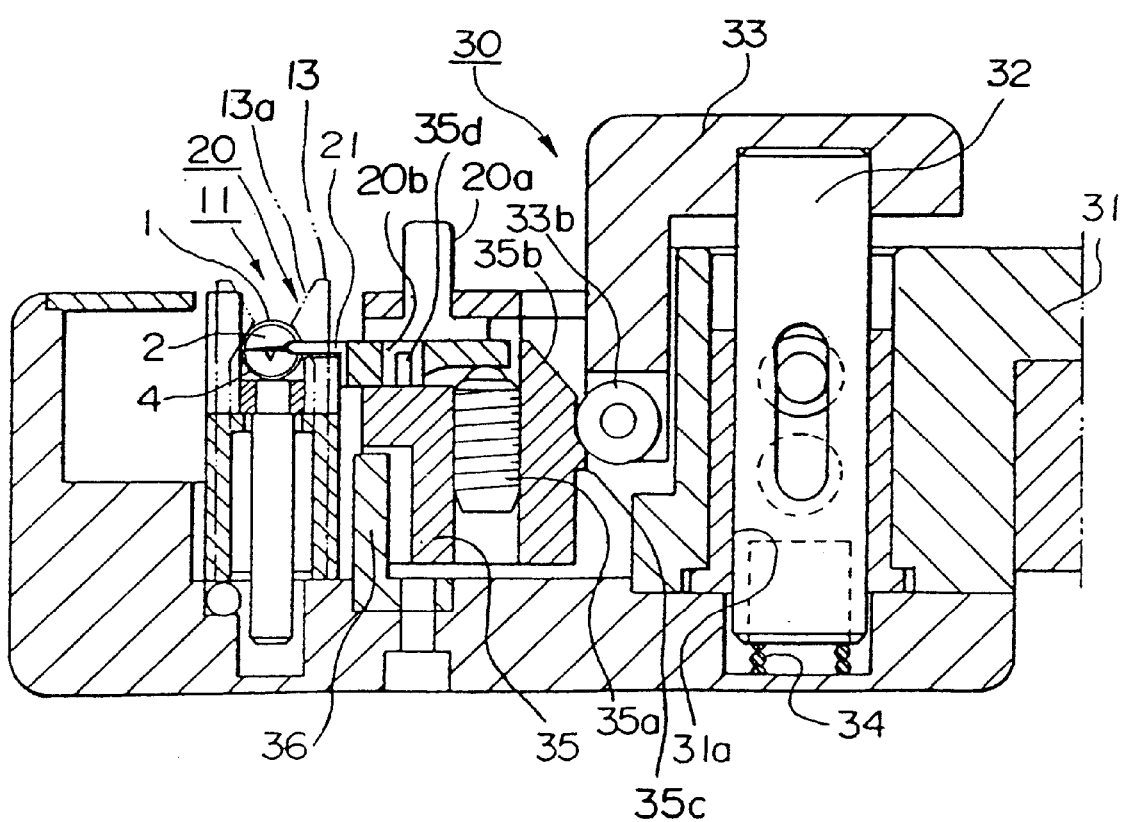
FIG. 8 is a cross section diagram along the III—III line, showing in particular the operating state of the pushing mechanism, and the state of release from the urging force after the push button is pushed to the preset depth.

However, at this time, the round part 41c engages with the engagement holes 32b when the push button 33 has been pushed to its lowest position and the axle 32 is slightly raised, accompanying the raising of the axle 32, the push button 33 is slightly raised. As a result, as shown in FIG. 8, because the roller 33 goes off the protruding part 35c and engages with a part other than the protruding part 35c of the moving platform 35, by the action of the tension means (not shown in the figure), the moving platform 35 moves towards the right side of the figure just enough to engage roughly the dimensions of the protrusion of the protruding part 35c. Because the wedge 20 can slide in the direction of the movement of moving platform 35, as is shown in FIGS. 7 and 8, even when the moving platform 35 moves, because the wedge 20 does not change its state of insertion between components 2,2 due to the resistance to extraction from between components 2,2 by the force of the clamp, the engagement pin 35d moves up to the small holes 20b due to the movement of the moving platform 35, and a clearance between the wedge 20 and the moving platform 35 is again formed.

Moreover, at this time, the protruding part 35c functions as the restoring mechanism as disclosed in claim 3.

In this state, the optical fibers 3,3 are inserted into the optical fiber connector 1 from both ends longitudinally guided by the clamp bodies 51,51. At this time, the clamp body 51 slides longitudinally (in direction A in FIG. 2) in the direction of the axle 51a, and the end to end force between the optical fibers 3,3 is increased.

Additionally, in FIG. 4B, opposing the tension of the spring 42, the knob 41a is moved to the right in the figure.

This being done, the round part 41c protrudes from the engagement holes 32b, and the round part 41c is released from the engagement to the engagement holes 32b, the push button 33 and the axle 32 are pushed up by the tension of the spring 34, and in this manner, moves from the state shown in FIG. 3 from FIG. 8. That is, as shown in FIG. 7D, the moving platform 35 is restored by a tension means (not shown) to a position separated from the optical fiber connector 1, the wedge 20 is caught on the engagement pin 35d, and by starting to move along with the moving platform 35, the optical fiber connector 1 is extracted, and the optical fibers 3,3 are clamped by the C-shaped spring 4 in a state of alignment and are end to end.

Figure 5A:
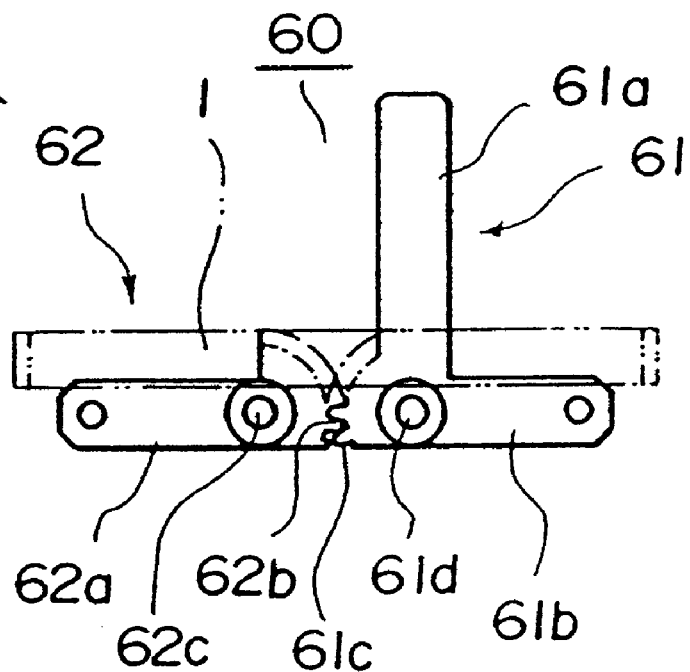
FIGS. 5A and 5B are explanatory drawings showing the ejector mechanism in the optical fiber connection device of FIGS. 1A and 1B showing it in the standard state (FIG. 5A) and the state under pressure.
Figure 5B:
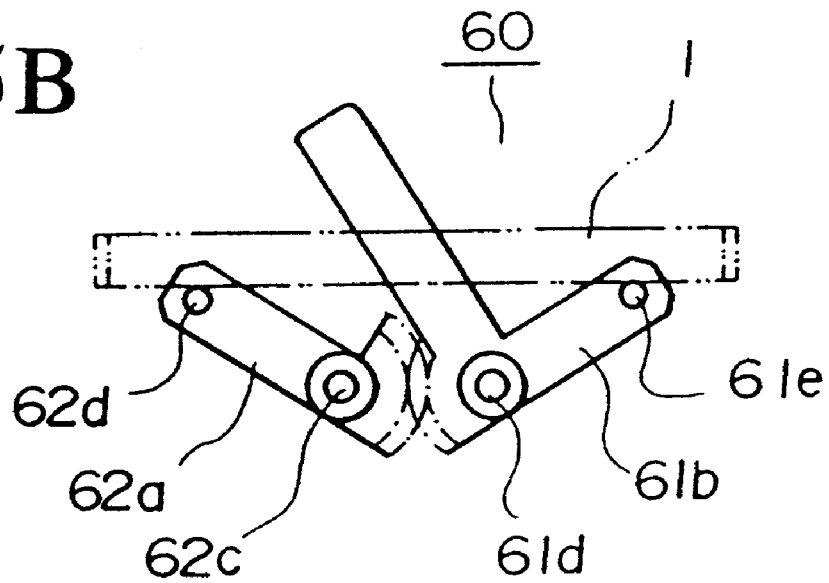

After this, as shown in FIG. 5B, the knob 61a of the knob member 61 is rotated.

This being done, by the engagement of gears 61c and 62b, the draw up parts 61b and 62a are drawn up together, and by the pin (not shown) extending towards the inside of the figure from the holes 61e and 62d, the optical fiber connector 1 is pushed up, raised out of the optical fiber connecting device 10, and taken out.

In the above manner, the end to end connection of the optical fiber 3 using the optical connector 1 when employing the optical fiber connection device 10 is complete.

As explained above, in the end to end connection of optical fiber 3 using the optical fiber connector 1 when employing the optical fiber connection device of the present invention, the following effects are obtained:

1. By the support mechanism 30, optical connector 1 is securely supported in the optical fiber connection device 10.

2. By the pushing mechanism 30, the wedge 20 is inserted easily and securely between the components 2,2 of the optical fiber connector 1, and opposing the pinching force of the C-shaped spring 4, components 2,2 can be easily spread apart.

3. By the engagement mechanism 40, the state of the wedge 20 being inserted and the components 2,2 being spread apart can be easily maintained.

4. By the joining mechanism 50, the end to end force between the optical fibers 3,3 can be easily increased.

5. By the ejector mechanism 60, the optical fiber connector 1 can be easily ejected from the optical fiber connecting device.

6. By the suspension member 70, the entire optical fiber connection device 10 can be suspended from another structure. This is particularly effective when the connection work is carried out at a high place, for example, at the top of a telephone pole.

7. When inserting the wedge 20, after pushing the push button 33 once to the predetermined depth, because by simply releasing the urging force of the push button 33, the moving platform on which the pinching action of has been completed automatically retracts, the component 2 can be maintained in an open state without any lateral pressure. In this manner, there is no need to worry that small distortions will develop in the component 2 or that the C-shaped spring will weaken, and the precision of the end to end connection of the optical fibers 3 is increased, and the desired connection loss is accurately obtained.

Second Connection Example

In the following, another method in which optical fibers are connected end to end using the optical fiber connector 1 when using an optical fiber connection device 10 having the above-described construction will be described.

Hereinbelow, an example of switching only one of the optical fibers 3 when two optical fibers 3,3 are already connected in the optical fiber connector 1, that is, a "switching connection", will be explained.

When making an end to end connection, first, the optical fiber connector 1 in which the two optical fibers 3,3 are already connected is mounted on the support platform 12.

At that time, the optical fiber connector 1 is securely and firmly held, as in the above first connection example.

Next, wedge 20 is moved to its predetermined position. Here, we will suppose that the one optical fiber that will be switched is the one positioned in the right side of the figure. In this case, as shown in FIG. 1B, the wedge 20 is slid towards the left side in the figure, and among the 4 openings 2b of the optical fiber connector 1, the right three are disposed to correspond with the blade body 21 of the wedge 20.

Then, the push button is pushed in the downward direction in the figure.

At this time, as shown in FIG. 6, the push button 33 and the axle 32 move downward, and furthermore, the moving platform 35 is pushed in the leftward direction, the wedge 20 is inserted between the components 2,2 by the openings 2b from the direction straight along the longitudinal direction of the optical fiber connector 1. This is the same as in the above-described first connection example.

However, in the present connection example, because wedge 20 is disposed to correspond to the right three openings from among the four openings of the optical fiber connector 1, the insertion of the wedge 20 only involves the right three openings 2b. Thus, the pinching force is released only in the above described one optical fiber which will be switched, while on the other optical fiber, the pinching force is not released, and of course remains inserted due to the C-shaped spring 4.

Additionally, in this case, when the push button 33 is pushed up to its predetermined position, as shown in FIG. 4B, due to the engaging of the round part 41c and the engagement holes 32b, the plush button 33 and the axle 32 are blocked from moving vertically. This is the same as in the above-described first connection example.

In this state, first, the above-mentioned optical fiber on which the pinching force has been released is removed. Next, the new optical fiber to be inserted in the replacement is guided by clamp body 51, and inserted into the optical fiber connector 1 longitudinally.

At this time, clamp body 51 is slid longitudinally, (direction A in the figure), and the end to end force on the optical fibers 3,3 is increased. This is the same as the abovedescribed first connection example.

Additionally, in FIG. 4B, the knob 41a is moved to the left in the figure in opposition to the tension of the spring 42.

At this time, the engagement between the round part 41c and the engagement holes 32b is released, and the push button 33 and the axle 32 are moved upward due to the tension of the spring 34. Further, the wedge 20 is extracted from the optical fiber connector 1, and both optical fibers 3,3 aligned end to end are clamped by the C-shaped spring 4. This is the same as the above-described first connection example.

Next, as shown in FIGS. 5A and 5B, the knob 61a of the knob member 61 is rotated, and the optical fiber connector 1 is ejected out of the optical fiber connection device and removed. This is the same as the above-described first connection example.

By the above steps, the "connection switching" of the optical fiber 3 using the optical fiber connector 1 when using the optical fiber connection device 10 is complete.

Moreover, in this connection switching work as well, the movement of wedge 20 corresponding to the operation of the push button 33 is the same as in the above-described first connection example.

As is clear from the above description, in the present connection example, the same effect as that obtained by the first connection example can be attained.

In addition, because wedge 20 is constructed so as to be able to slide in the longitudinal direction of the optical fiber connector 1, it is possible to select the position in the direction depending on the area in the longitudinal direction of component 2 which should be spread out, and thus, releasing the insertion of only one optical fiber while maintaining the insertion of the other optical fiber as-is can be performed. That is, when applying the connection switching of optical fibers, there is no influence at all on the other optical fiber which will not be replaced, and it is possible to switch only the optical fiber on one side. Thus it can be adapted conveniently to optical fiber connection replacement.

Moreover, the present invention is not limited to the above-described embodiments, but even when the following alterations are made, it still naturally lies within the conception of the present invention:

a) In place of the optical fiber connector 1 applied in the optical fiber connection device 10, an optical fiber connector with design alterations in the number of openings, the overall shape, size, and diameter can be employed.

In this case, the optical fiber connection device 10 naturally requires design alterations coordinated with those of the optical fiber connector.

b) In the second connection example, instead of the optical fiber to be switched being on the right-hand side of the figure, it may be on the left-hand side of the figure.

c) In the second connection example, when the optical fiber on the right-hand side of the figure is switched, instead of the wedge 20 being disposed corresponding to the right three openings among the four openings 2b of the optical fiber connector 1, it will be disposed corresponding to the right two openings 2b.

This is exactly the same if the optical fiber to be switched is on the left-hand side of the figure.

d) In place of the support mechanism, a support mechanism of another arbitrary shape having the same function can be used.

e) In place of the wedge 20 with the shape shown in the figures, a wedge with another arbitrary shape having the same function can be used.

f) In place of the pushing mechanism, a pushing mechanism of another arbitrary shape having the same function can be used.

g) In place of engagement mechanism 40, an engagement mechanism of another arbitrary shape having the same function can be used.

h) In place of the end to end mechanism 50, an end to end mechanism of another arbitrary shape having the same function can be used.

i) In place of the ejection mechanism 60, an ejection mechanism of another arbitrary shape having the same function can be used.

j) In place of the suspension member 70 with the shape shown in the figures, a suspension member of another arbitrary shape having the same function can be used. Alternatively, the suspension member can be omitted.

k) In place of the engagement pins 35d, engagement pins of another arbitrary shape having the same function can be used.

l) The restoring of the wedge 20 inserted in component 2 can be performed by a specially installed wedge restoration mechanism in place of the engagement pins 35d.

What is claimed is:

1. An optical fiber connection device 10 used to connect optical fibers end to end, and using an optical fiber connector 1 which has components 2 with a two piece structure disposed over each other and held against one another by a tension means, and at one end or the other end of which one or the other optical fibers 3,3 is inserted between said components, determining the alignment position so as to be able to connect optical fibers end to end, and characterized in comprising:

a support mechanism 11 supporting said optical fiber connector 1 a separation member 20 for releasing said optical fibers by spreading in the direction of separation said components by opposing the tension of said tension means when inserted into said components from a direction straight along the longitudinal direction said optical connector; and a pushing device 30 which inserts said separation member between said components by applying urging force in the direction of the optical connector to said separator.

2. An optical fiber connection device according to claim 1, characterized in the separator member being constructed so as to be able to move along the longitudinal direction of the components, and a knob 20a protruding in order to move it manually.

3. An optical connector device according to claim 1, characterized in having a moving platform 35 wherein said pushing mechanism is installed so as to freely approach and separate from the optical fiber connector supported by the support mechanism and applying an urging force to the separator member when it is adjacent to the optical fiber connector, and a restoration device 35c which restores the separation between the moving platform and the optical fiber connector at the same time releasing the urging force of the push pressure mechanism which applies urging force on the moving platform in the direction approaching the optical fiber connector, and tolerates a relative change in position between the moving platform and the separation device when the moving platform is moved in the direction of separation from the optical fiber connector.

4. An optical connector device according to claim 3, characterized in an engagement member 35d protruding from the moving platform engaging engagement holes 20b formed on the separation member, and tolerating a relative change in position between the moving platform and the separator member within a range of clearance between the engagement holes and engagement member when the moving platform separates from the optical fiber connector.

5. An optical fiber connection device according to claim 1, a joining device which supporting an optical fiber inserted in the optical connector supported by the support device provided on the side of the support mechanism, the upper extension of the aligning axis in the optical fiber connector, and said joining mechanism is provided with a clamp body 51 which brings in and lets out the optical fiber while maintaining its position on the said alignment axis.

6. An optical fiber connection device according to claim 1, characterized in comprising a suspension member 70 for suspension from an immobile structure.

7. An optical fiber connecting device according to claim 1, wherein said support mechanism is freely detachable from the optical fiber connector, and ejects the optical fiber connector supported in said support mechanism from the support mechanism.

8. An optical fiber connecting method characterized in:

a first step in which the position of an optical fiber connector which has components with a two piece structure disposed longitudinally one over the other and held against each other by a tension means, and one or the other of the optical fibers being inserted in one or the other end of said components, and which positions said optical fibers in alignment for end to end connection, is supported;

a second step in which the components into which said optical fibers are inserted are opened by a separator member;

a third step in which optical fibers are inserted from the longitudinal ends of the open components, and the optical fibers at the longitudinal ends of the components in the longitudinal central part of said components are joined end to end; and a fourth step in which the separator member is extracted from the components while an end to end force is applied to the optical fibers laid end to end in the direction so as to urge them, and by the tension of the tension means, the optical fibers are clamped within the components.

* * * * *